(12) United States Patent
Ishikawa et al.

(10) Patent No.: US 11,579,378 B2
(45) Date of Patent: Feb. 14, 2023

(54) REVERSIBLE OPTICAL CONNECTORS AND ASSOCIATED DEVICES, SYSTEMS, AND METHODS

(71) Applicant: Sanwa Electronics USA Corporation, Plano, TX (US)

(72) Inventors: Akihito Ishikawa, Allen, TX (US); Tomoaki Kaga, Plano, TX (US); Takashi Sato, Tokyo (JP)

(73) Assignee: SANWA ELECTRONICS USA CORPORATION, Plano, TX (US)

( * ) Notice: Subject to any disclaimer, the term of this patent is extended or adjusted under 35 U.S.C. 154(b) by 0 days.

(21) Appl. No.: 17/707,339

(22) Filed: Mar. 29, 2022

(65) Prior Publication Data

US 2022/0221655 A1    Jul. 14, 2022

Related U.S. Application Data

(63) Continuation of application No. 17/172,904, filed on Feb. 10, 2021, now Pat. No. 11,347,009, which is a
(Continued)

(51) Int. Cl.
*G02B 6/38* (2006.01)

(52) U.S. Cl.
CPC ........... *G02B 6/3879* (2013.01); *G02B 6/387* (2013.01); *G02B 6/3831* (2013.01);
(Continued)

(58) Field of Classification Search
None
See application file for complete search history.

(56) References Cited

U.S. PATENT DOCUMENTS

| 7,588,373 B1 * | 9/2009 | Sato ..................... G02B 6/3893 385/59 |
| 10,078,186 B1 | 9/2018 | Hsu et al. |

(Continued)

FOREIGN PATENT DOCUMENTS

| CN | 106383383 A | 2/2017 |
| JP | 2009276493 A | 11/2009 |

OTHER PUBLICATIONS

European Patent Office, Extended European Search Report for Application No. 20159050.2-1001, dated Jul. 2, 2020, 17 pages.
(Continued)

*Primary Examiner* — Jerry Rahll
(74) *Attorney, Agent, or Firm* — Haynes and Boone, LLP

(57) ABSTRACT

Reversible optical connectors, and associated devices and methods are provided. In one embodiment, a connector for a communication cable includes a housing comprising a cavity, and a first plug and a second plug coupled to a distal portion of the housing. The first and second plugs are connected to the housing such that the first and second plugs are independently rotatable with respect to the housing. The connector further includes a latch actuator coupled to the housing and configured to disengage one or more latches from an outlet. By rotating the plugs 180 degrees and turning the connector over, the relative arrangement or position of the two plugs can be switched or reversed. The plugs can be rotated or reversed without completely disassembling the connector, in some embodiments. Accordingly, embodiments of the present disclosure can improve workflows for a user or operator that in a high-density networking setting.

20 Claims, 12 Drawing Sheets

Related U.S. Application Data continuation of application No. 16/797,283, filed on Feb. 21, 2020, now Pat. No. 10,996,404.

(60) Provisional application No. 62/810,219, filed on Feb. 25, 2019.

(52) U.S. Cl.
CPC ......... *G02B 6/3871* (2013.01); *G02B 6/3889* (2013.01); *G02B 6/38875* (2021.05)

(56) References Cited

U.S. PATENT DOCUMENTS

| | | |
|---|---|---|
| 2016/0349458 A1 | 12/2016 | Murray |
| 2017/0363818 A1* | 12/2017 | Suzic .................... G02B 6/3879 |
| 2018/0088288 A1* | 3/2018 | Taira .................... G02B 6/3885 |

OTHER PUBLICATIONS

HYC Co., Ltd., "LC Uniboot Connector," https://hyc-system.com/Product/index_200/1107 (last visited May 22, 2020), pp. 9.

\* cited by examiner

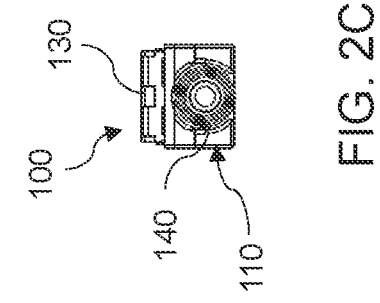
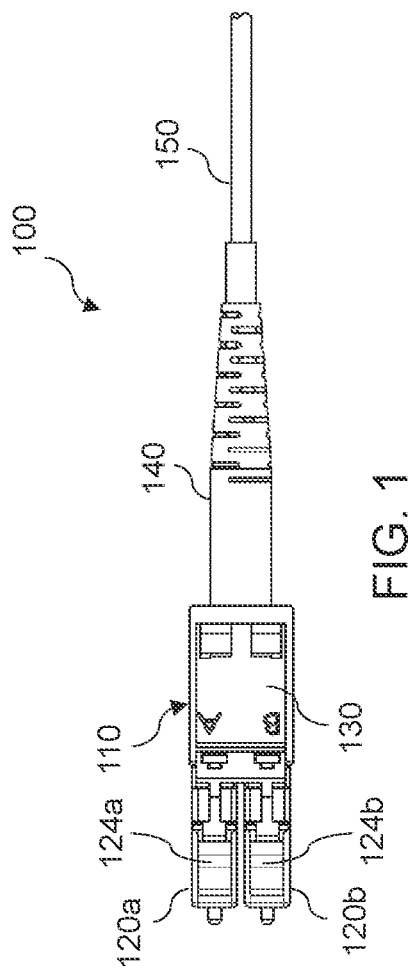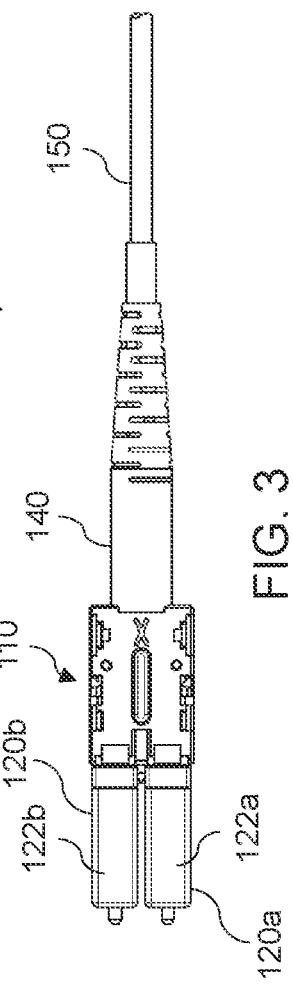
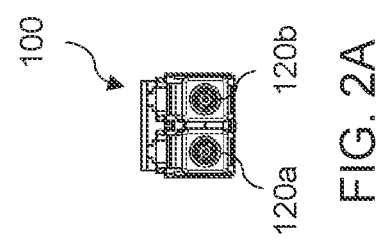

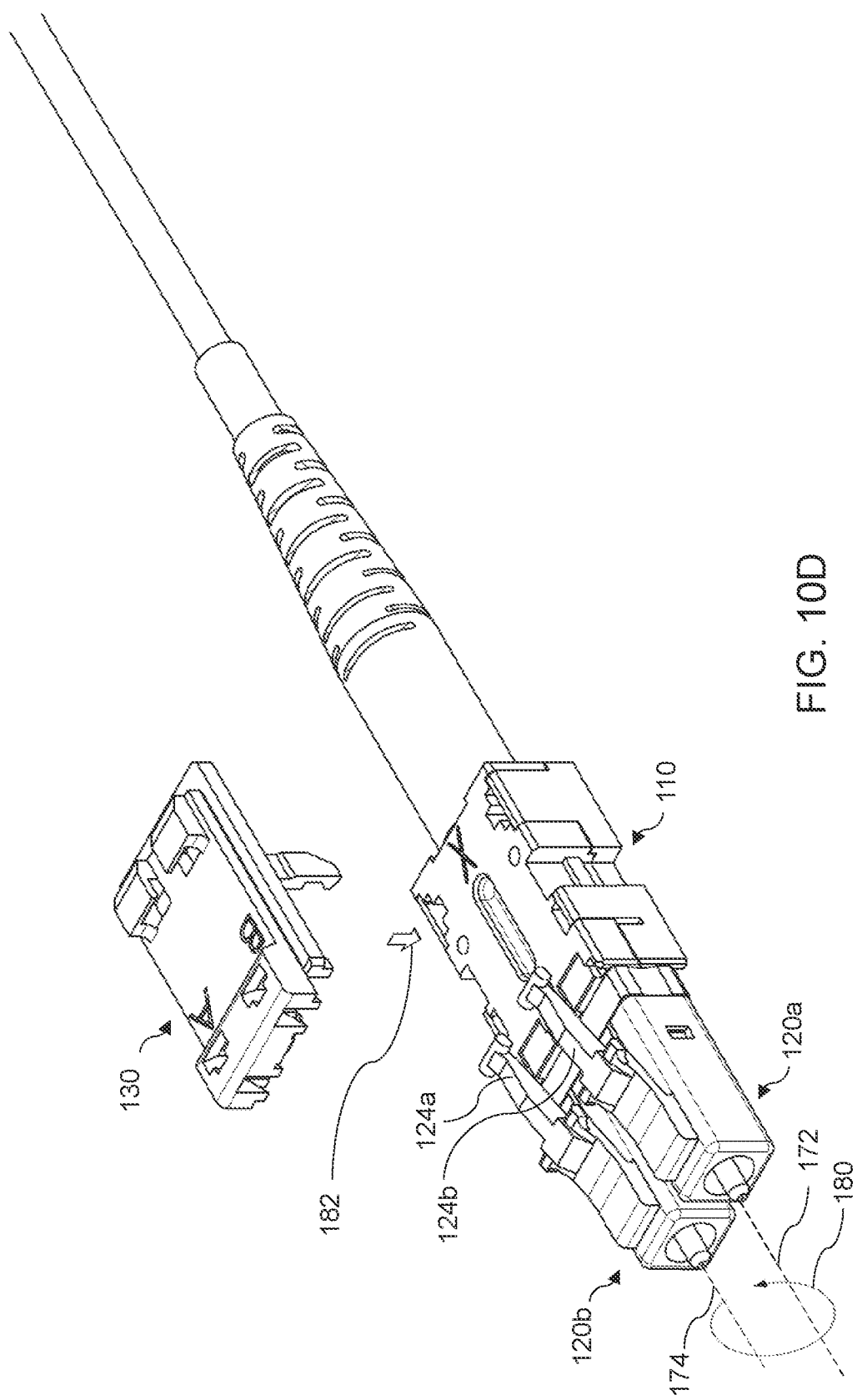

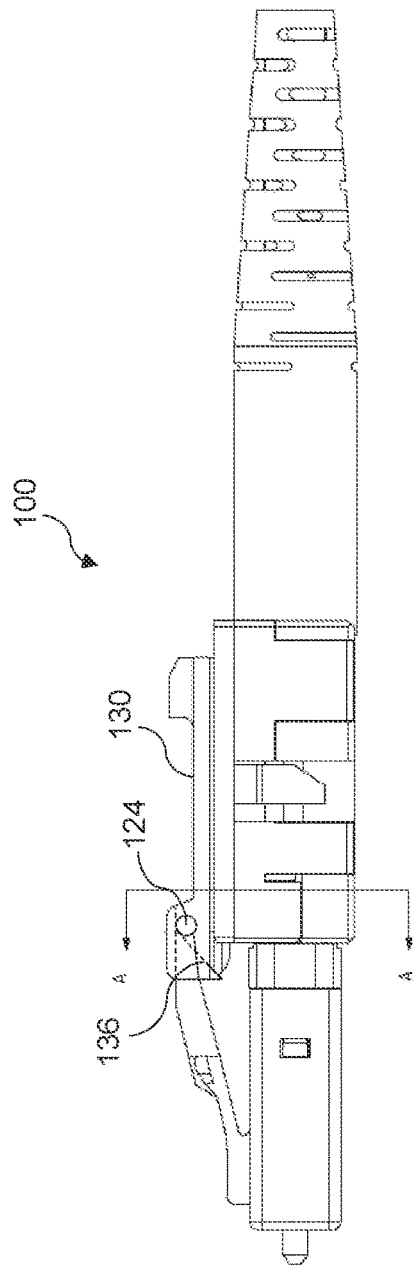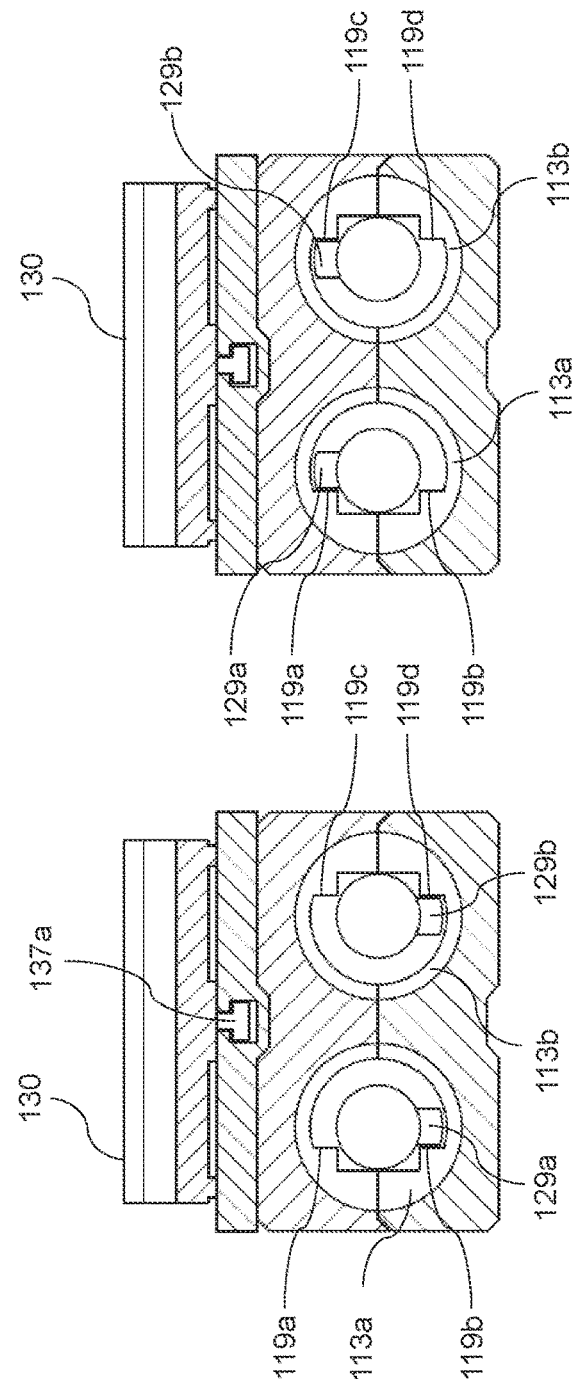

REVERSIBLE OPTICAL CONNECTORS AND ASSOCIATED DEVICES, SYSTEMS, AND METHODS

CROSS REFERENCE TO RELATED APPLICATIONS

This patent application is a continuation of U.S. patent application Ser. No. 17/172,904, filed Feb. 10, 2021, which is a continuation of U.S. patent application Ser. No. 16/797,283 filed Feb. 21, 2020, which claims priority to and the benefit of U.S. Provisional Patent Application No. 62/810,219, filed Feb. 25, 2019, each of which is hereby incorporated by reference in its entirety.

TECHNICAL FIELD

The present disclosure relates generally to optical connectors, more particularly, to optical connectors that include reversible plugs.

BACKGROUND

Some conventional connector mechanisms for optical fibers include latches that are depressed by a user, typically using the thumb or finger, to cancel the latch connection with a corresponding adapter. Accordingly, two separate motions are used to disconnect a connector from an adapter or outlet: a downward press, and a proximal pull. These motions involve positioning the user's hands around the connector near the base of the connection. In recent years, high density mounting configurations have become more prevalent in, for example, data centers and network servers. In high density mounting configurations, many connectors are connected to a server, bus, hub, local terminating cabinet, or switch, in close proximity to one another. Accordingly, it may not be convenient, practical, or possible for a user to position her hands around the connector near the adapter, as space is limited.

Further, many connectors include multiple plugs positioned side-by-side to facilitate multiple channels of communication. Occasionally, it is desirable to switch the arrangement of plugs on a single connector. This may not be possible or practical to do without disconnecting or separating the connector from its corresponding optical fiber, switching the arrangement, and reconnecting the connector to the optical fiber. In that regard, conventional optical connectors may not be suitable for disassembly and reassembly. Accordingly, present connectors lack flexibility to be changed to fit the particular application and are poorly-suited for high-density mounting situations.

SUMMARY

The present disclosure provides devices, systems, and methods for providing a reversible optical connection. In some embodiments, a connector includes two or more plugs rotatably coupled to a housing such that the plugs can rotate relative to the housing. By rotating the plugs 180 degrees and turning the connector over, the relative arrangement or position of the two plugs can be switched or reversed. The plugs can be rotated or reversed without completely disassembling the connector, in some embodiments. Further, in some embodiments, the connectors can include a latch actuator that is detachably or removably connected to the housing. The latch actuator allows for respective latches of the plugs to be actuated to cancel a connection to an adapter using a longitudinal or proximal motion only, without a downward press. In some embodiments, a pull tab can be used to pull the latch actuator and cancel the connection, such that the user's hands may be positioned away from the junction between the connector and the adapter. Accordingly, the embodiments of the present disclosure can improve workflows for a user or operator that makes frequent modifications to communication networks in a high-density setting.

In some embodiments, a connector for a communication cable includes a housing comprising a cavity, and a first plug and a second plug coupled to a distal portion of the housing. The first plug defines a first longitudinal axis and the second plug defines a second longitudinal axis. The first and second plugs are each independently rotatable about the first and second longitudinal axes respectively with respect to the housing. The first plug comprises a first latch and the second plug includes a second latch. The connector further includes a latch actuator coupled to the housing and comprising at least one camming surface configured to actuate the first and second latches to disengage the first and second latches from an outlet.

In some embodiments, the first plug and second plug are configured to rotate independently of one another. In some embodiments, the first and second plugs comprise cylindrical flanges positioned within respective cylindrical cavities at the distal portion of the housing. In some embodiments, the first and second plugs comprise respective conduits disposed within the cavity of the housing, the respective conduits configured to carry respective communication lines. According to some aspects, the communication lines comprise optical fibers, and the conduits of the first and second plugs are configured to house a first optical fiber and a second optical fiber, respectively.

In some embodiments, the latch actuator is removably coupled to the housing and the housing and latch actuator are configured such that the latch actuator can be coupled to a top side of the housing or a bottom side of the housing. In some embodiments, the housing comprises at least one ridge and the latch actuator comprises at least one pawl connector configured to releasably engage the at least one ridge of the housing. In some embodiments, the latch actuator comprises a top plate and a bottom plate coupled to the top plate and configured to slide longitudinally relative to the top plate. According to one aspect, the connector may further includes a pull tab coupled to and extending proximally of the top plate of the latch actuator. In another aspect, the first and second latches is biased away from the first and second plug, and the latch actuator is configured to depress, via the at least one camming surface, the first and second latches by sliding the top plate longitudinally relative to the bottom plate. In some embodiments, the first and second latches comprise respective locking surfaces positioned at intermediate portions of the first and second latches, wherein the locking surfaces are configured to engage corresponding surfaces in an adapter. In some embodiments, the first and second plugs extend distally and in parallel from the distal portion of the housing.

According to some embodiments, a connector for communication lines includes: a connector housing, a first plug body extending distally from the connector housing, the first plug body defining a first longitudinal axis, a first latch coupled to a side of the first plug body, a second plug body extending distally from the connector housing, the second plug body defining a second longitudinal axis, a second latch coupled to a side of the second plug body, and a camming member slidably coupled to the connector housing and configured to simultaneously actuate the first and second latches. In one aspect, each of the first plug body and the second plug body are configured to rotate at least 180 degrees relative to the connector housing.

In some embodiments, the camming member comprises first and second plates slidably coupled to one another. The camming member may include first and second attachment arms extending orthogonal to a plane of translation of the first and second plates. The connector housing may include a first protrusion on a first side and a second protrusion on a second side. The first arm can include a first barb engaging the first protrusion, and the second arm can include a second barb engaging the second protrusion. In some embodiments, the first barb comprises an angled surface configured to engage the second protrusion. In some embodiments, the connector housing is symmetrical about a central axis.

According to other embodiments of the present disclosure, a method for switching a plug configuration of a connector includes disconnecting a latch actuator from a first side of a housing of the connector, rotating a first plug 180 degrees relative to the housing while the first plug is connected to the housing, the first plug comprising a first latch, rotating a second plug 180 degrees relative to the housing while the second plug is connected to the housing, the second plug comprising a second latch, and connecting the latch actuator to a second side of the housing such that the latch actuator is configured to simultaneously actuate the first and second latches.

In some embodiments, connecting the latch actuator to the second side of the housing comprises engaging a barb of the latch actuator with a ridge disposed on an outer surface of the housing. In some embodiments, the method further includes pulling a tab coupled to the latch actuator to disengage the first and second latches from a corresponding connector. In some embodiments, pulling the tab causes a top plate of the latch actuator to slide relative to a bottom plate of the latch actuator to move a camming surface of the latch actuator over the first and second latches.

According to another embodiment of the present disclosure, a method for assembling a connector includes providing a first housing body, coupling a first plug the first housing body such that the first plug is configured to rotate relative to the first housing body, coupling a second plug to the first housing body such that the first plug is configured to rotate relative to the first housing body, coupling an opposing second housing body to the first housing body such that the first and second housing bodies form an enclosed housing, and such that the first and second plugs are configured to rotate relative to the housing, and coupling a latch actuator to a side of the housing.

BRIEF DESCRIPTION OF THE DRAWINGS

FIG. 1 is an elevation view of a top side of a reversible optical connector according to one or more embodiments of the present disclosure.

FIG. 2A is a front plan view of a distal end of a reversible optical connector according to one or more embodiments of the present disclosure.

FIG. 2B is a side elevation view of a reversible optical connector according to one or more embodiments of the present disclosure.

FIG. 2C is a rear plan view of a proximal end of a reversible optical connector according to one or more embodiments of the present disclosure.

FIG. 3 is an elevation view of a bottom side of a reversible optical connector according to one or more embodiments of the present disclosure.

FIGS. 10A-E are perspective views of a reversible optical connector at various stages of the method shown in FIG. 9 according to one or more embodiments of the present disclosure.

FIG. 11 is a partially transparent elevation view of a reversible optical connector according to one or more embodiments of the present disclosure.

FIGS. 12A and 12B are cross-sectional views of the reversible optical connector of FIG. 11 including a rotation stop, according to one or more embodiments of the present disclosure.

DETAILED DESCRIPTION

Figure 4:
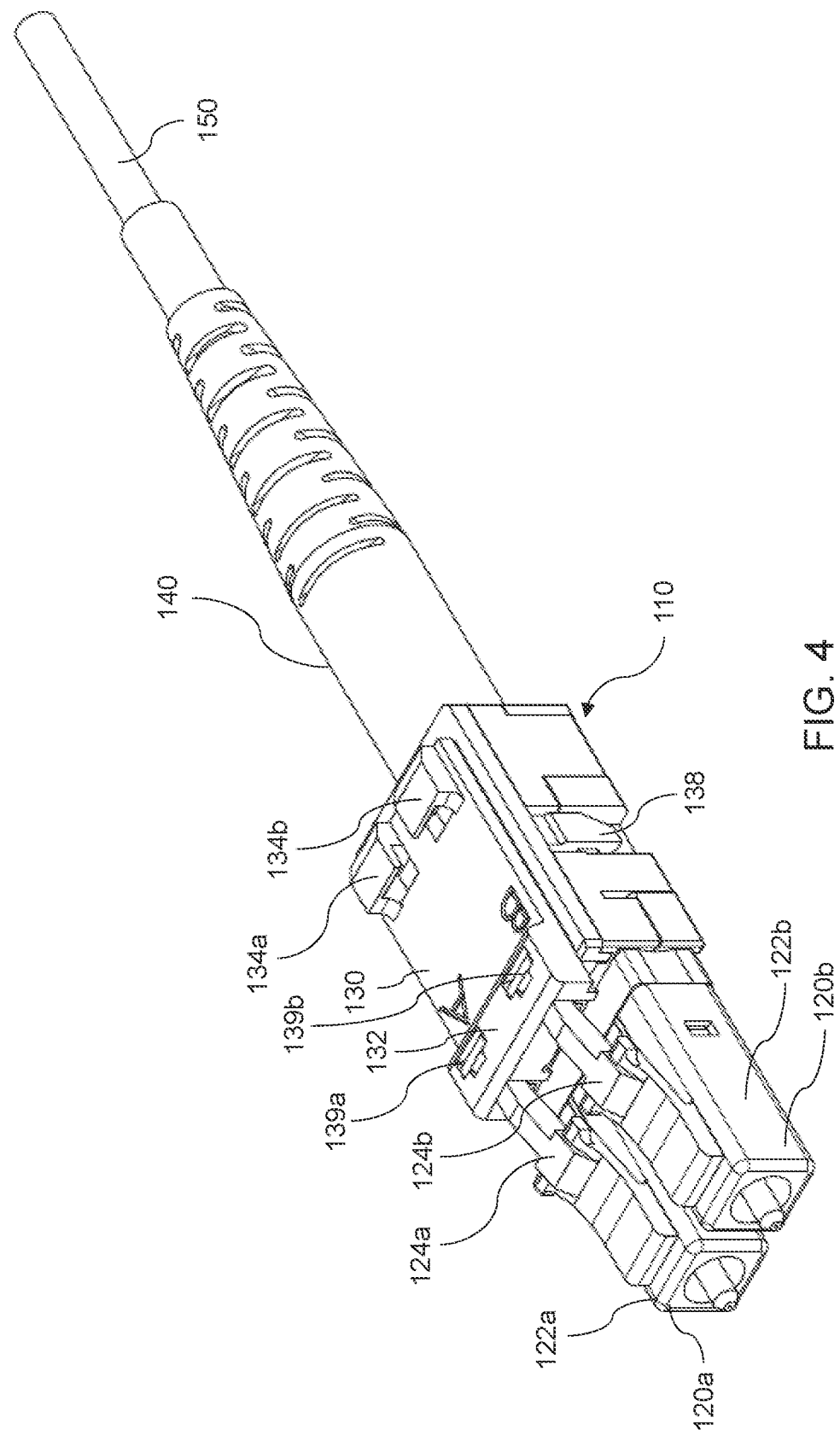
FIG. 4 is a perspective view of a reversible optical connector according to one or more embodiments of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

The present disclosure describes connectors that provide for reversible plug configurations and advantageous connection release mechanisms. It will be understood that, although the disclosure describes connectors for use in optical communications, such as fiber optic communications, the present disclosure is in no way limited to optical communication. In that regard, embodiments of the present disclosure could be used for other types of connectors, including wired electrical connectors and others.

In some embodiments, an optical connector includes a housing or main body, and two or more plugs coupled to and extending from the housing. The plugs are coupled to the housing such that the plugs can rotate relative to the housing. By rotating each of the plugs 180 degrees relative to the housing, and turning the connector over, the positioning of the plugs with respect to one another is switched or reversed. In some embodiments, the relative positioning of the plugs can be switched or reversed by hand, and without the use of tools.

Further, in some embodiments, a connector includes a latch actuator that translates a longitudinal pulling force into downward force on one or more latches to cancel or unlatch a connection of the latches with a corresponding adapter. For example, the latch actuator can be slidably coupled to the connector housing and configured to slide or shift relative to the latches. The sliding latch actuator can include a cam or camming surface configured to depress the latches as the latch actuator moves longitudinally. The latch actuator can be removably coupled to the housing such that it can be detached to reverse the plug configuration, and reattached after the plug configuration has been successfully reversed.

Referring to FIGS. 1-3, an optical connector 100 includes a housing or main body 110, first and second plugs 120a, 120b coupled to and extending distally of the housing 110, and a latch actuator 130 coupled to a first side or top side of the housing 110. The connector 100 also includes a strain relief 140 coupled to a proximal end of the housing 110 and configured to provide a transition in rigidity between the housing 110 and the optical cable 150. Referring to FIG. 1, the connector 100 includes a first plug 120a and a second plug 120b coupled to and extending distally from the housing 110. The plugs 120a, 120b may be LC type plugs, in some embodiments. The first and second plugs 120a, 120b extend in parallel, and are configured to be inserted into a corresponding adapter or outlet to create a connection for the communication of signals carried by the cable 150 to a computing system, switch, hub, bus, server, or any other suitable electrical component via an adapter or outlet. In some embodiments, the adapter (not shown) is configured to convert optical signals carried by the optical cable 150 into electrical signals.

Referring to FIGS. 2A to 2C, each plug 120a, 120b includes a corresponding latch 124a, 124b or locking piece coupled to a lateral side, shown here as a top side, of a body 122a, 122b of the respective plug 120a, 120b. In some embodiments, the latches 124a, 124b and plug bodies 122a, 122b are integrally formed, such as by injection molding. In other embodiments, the plug bodies 122a, 122b and latches 124a, 124b are formed separately and attached during an assembly process. In the implementation shown, the latches 124a, 124b are connected to the bodies 122a, 122b at one end, such as a distal end, and may elastically flex or pivot relative to the body so as to bias the latches 124a, 124b away from a surface of the plug bodies 122a, 122b and to form an oblique angle with respect to the plug bodies 122a, 122b. The latches 124a, 124b are flexible, such that they can be depressed toward the plug bodies 122a, 122b. As will be explained further below, in some embodiments, depressing the latches 124a, 124b cancels or unlatches a corresponding connection between the connector 100 and an adapter for disengaging the latches 124a, 124b with a corresponding catching surface of the adapter.

The latch actuator 130 is coupled to a side, such as a top side of the housing 110, such that one or more components or features of the latch actuator 130 can slide or translate relative to the housing 110 and the latches 124a, 124b. As will be explained further below, an end of each latch 124a, 124b, which in the implementation shown is in a proximal portion of the corresponding latch 124a, 124b, is coupled to the latch actuator 130, and moving the latch actuator 130 proximally relative to the latches 124a, 124b induces a downward force on each latch 124a, 124b sufficient to displace the latch and cancel or unlatch a connection between the connector 100 and the adapter. In the implementation shown, the latch actuator 130 may simultaneously displace (such as by depressing) two latches, while in other implementations, the latch actuator may displace a single latch or a larger number of latches. In some implementations, the latch actuator may simultaneously displace between two and twenty-four latches, although other numbers are also contemplated.

FIG. 3 shows a bottom surface of the connector 100. The bottom surface of the housing 110 is shown exposed, as the latch actuator 130 is attached to the opposing top surface of the housing 110. Similarly, the latches 124a, 124b are not visible, as they are positioned on the opposing surface of the plug bodies 122a, 122b. In some embodiments, the housing 110 is symmetrical about a central plane of the housing 110 such that a top surface of the housing 110 is substantially similar or identical to a bottom surface of the housing 110. The bottom surface of the housing 110 includes an "X" mark to indicate that the bottom side of the connector 100 is facing upwards. As shown further below, the housing 110 can include a different mark, such as a "V", on the opposing side of the housing 110 to allow a user to determine which side faces up or down. Although the X and the V marks are shown on the example connector 100 of FIG. 3, any symbol or indicia could be used so long as they are different on the top and bottom sides to convey to a user that the two sides are different.

FIG. 4 shows a close-up perspective view of the proximal portion of the connector 100. The latch actuator 130 of the connector 100 is coupled to the housing 110 via connecting arms 138, which may also be referred to as pawl fingers, and are positioned on each side of the latch actuator 130. The connecting arms 138 extend downward from the latch actuator 130 and engage a corresponding surface or ridge 118 of the housing 110 (shown in FIG. 6 and described below). Proximal portions 139a, 139b of the latches 124a, 124b are positioned within a camming portion 132 of the latch actuator 130. The camming portion 132 includes camming surfaces 136 (shown in FIG. 11 and described below) configured to cause a downward displacement or cancelling force on the latches 124a, 124b as the latch actuator 130 is moved proximally relative to the latches 124a, 124b and housing 110. The latch actuator 130 also includes tab grips 134, which are configured to engage a distal end, such as a hook, of a tab to facilitate convenient actuation of the latch actuator 130, and consequently, cancellation or downward displacement of the latch connection.

Figure 5:
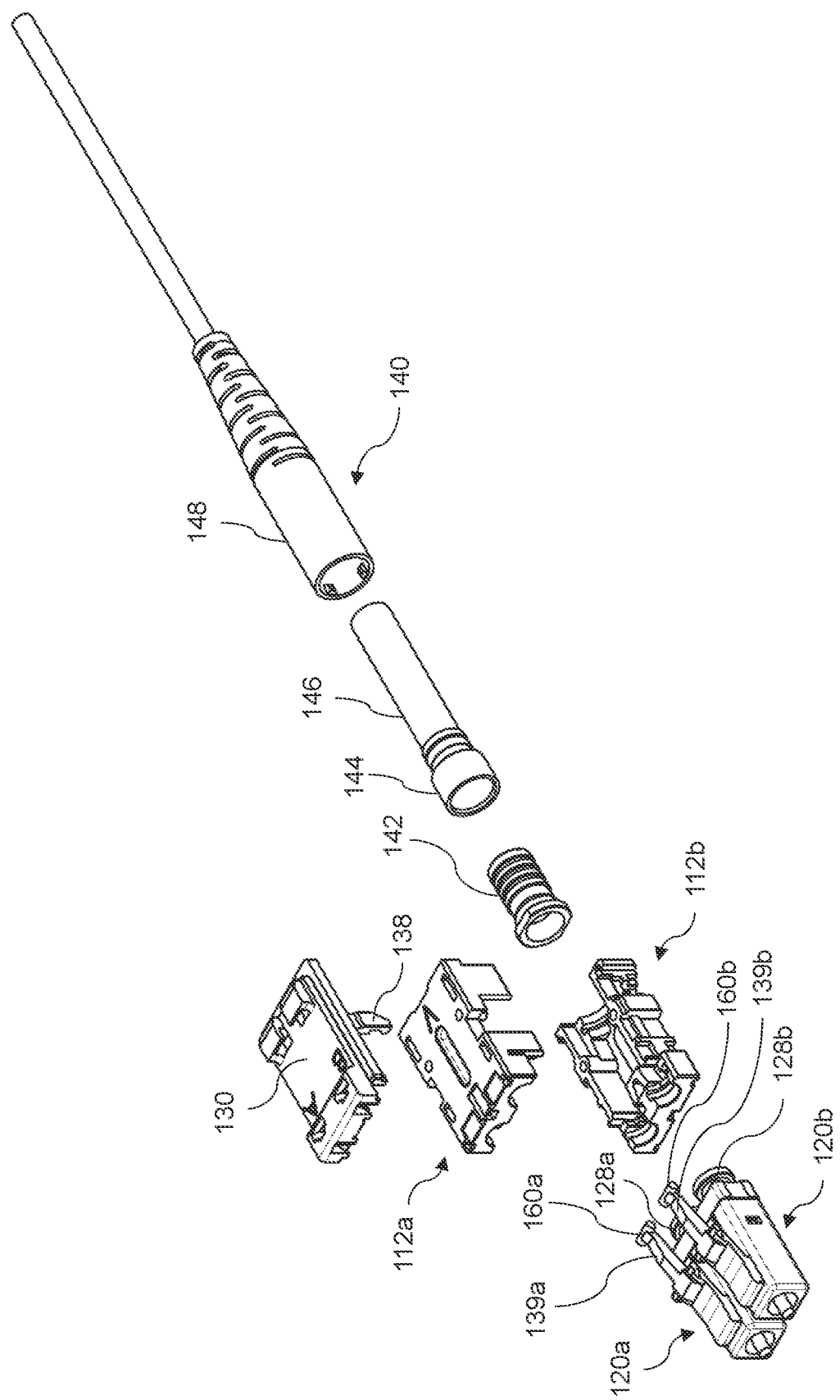
FIG. 5 is an exploded view of a reversible optical connector according to one or more embodiments of the present disclosure.

FIG. 5 is an exploded view showing the individual components of the connector 100, according to some embodiments. As shown, the housing 110 is formed of a first housing body 112a and a second housing body 112b, which can be connected to one another to form the housing body 110. As mentioned above, the bodies or portions 112a, 112b of the housing 110 can be shaped or configured such that the housing 110 is symmetrical about a central plane when the bodies 112a, 112b are connected. Accordingly, the latch actuator 130 can be connected or coupled to either side of the housing 110. The first and second plugs 120a, 120b comprise respective proximal flanges 128a, 128b configured to be positioned within corresponding slots, cavities, or wells of the housing 110 to provide a rotatable connection of the plugs 120a, 120b to the housing 110. For example, a connector assembly process can include positioning the proximal flanges 128a, 128b within corresponding slots of the second body portion 112b. The first housing portion 112b can then be coupled to the second housing portion 112b such that the plugs 120a, 120b can rotate relative to the housing 110. In that regard, each of the plugs 120a, 120b is independently rotatable relative to the housing 110 such that rotation of one plug 120a can be accomplished without rotating the other plug 120b. In the implementation shown, the flanges 128a, 128b and cavities are be cylindrical. However, the plugs 120a, 120b may be coupled to the housing 110 using other arrangements, such as by cylindrical bodies that form a removable interference fit with corresponding cylindrical cavities of the housing 110, whereby the plugs 120a, 120b can be separated from the housing 110 without disassembling the housing 110. In some embodiments, the housing 110 includes flanges that fit within corresponding cavities or channels of the plugs 120a, 120b. These implementations are not limiting, and it will be understood that other coupling arrangements for the plugs and housing are also contemplated by the present disclosure.

The components of the strain relief 140 are positioned at the proximal end or portion of the connector 100. In particular, a caulking holder 142 is coupled to a proximal end of the housing 110, and extends proximally of the housing 110. A distal flange of the caulking holder 142 can be positioned within a corresponding slot in the housing 110 to provide for a robust connection when the first and second housing bodies 112a, 112b are connected. A caulking ring 144 and heat shrink tube 146 can be positioned over or around a proximal portion of the caulking holder 142. Further, a boot 148 or bushing is configured to be positioned over the heat shrink tube 146, caulking ring 144, and caulking holder 142 such that the boot 148 abuts the proximal end of the housing 110. Together, the caulking holder 142, caulking ring 144, heat shrink tube 146, and boot 148 form a strain relief 140 that provides for a transition from the rigid housing 110 to the flexible cable 150.

Figure 6:
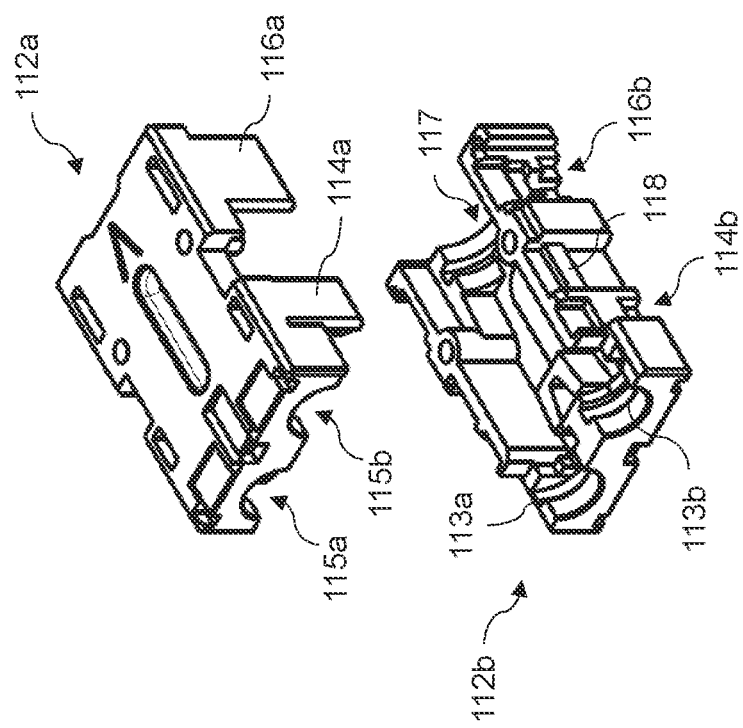
FIG. 6 is an assembly view of a housing of a reversible optical connector according to one or more embodiments of the present disclosure.

A close-up view of the housing bodies 112a, 112b are shown in FIG. 6. An outer surface of the first housing body 112a includes a marking or indicia, which in this example is a "V" to indicate a first side of the housing 110. Further, the first housing body 112a includes first and second locking tabs 114a, 116a, which are configured to engage corresponding locking surfaces 114b, 116b of the second housing body 112b. In the example shown, the first and second locking surfaces 114b, 116b are grooves or recesses formed in the sides of the second housing body 112b. The grooves or recesses may include connecting elements, formed as depressions and protrusions and other mechanically interfering structure that engages and connects with the locking tabs 114a, 116a. The first and second housing bodies 112a, 112b cooperate to form a cavity through with the fiber may pass and serve to maintain other components in place relative to each other.

The first housing body 112a includes top opening portions 115a, 115b, which align with bottom opening portions 113a, 113b to form first and second openings that receive the proximal flanges 128a, 128b of the plugs 120a, 120b. In this example, the first and second openings comprise round slots or wells in which a proximal portion of the plugs 120a, 120b reside. In this manner, by enclosing the proximal flanges 128a, 128b of the plugs 120a, 120b within the first and second housing bodies 112a, 112b, the plugs 120a, 120b are attached to the housing 110 and configured to rotate relative to the housing 110. The second housing body 112b further comprises a ridge 118 configured to engage a barb or pawl 139 (FIG. 7) of the connecting arm 138 of the latch actuator 130. In some implementations, the first and second housing bodies 112a, 112b are coupled to one another using other approaches or arrangements, such as using interference fits, dowels, adhesives, or any other suitable coupling arrangement. The housing 110 also includes a proximal opening 117 through which an optical fiber, or electrical wire, can be positioned and connected to the plugs 120a, 120b. For example, a flange of the caulking holder 142 can be positioned within a slot of the housing 110 near the opening 117 to form a connection similar to that between the plugs 120a, 120b and the housing 110.

Figure 7:
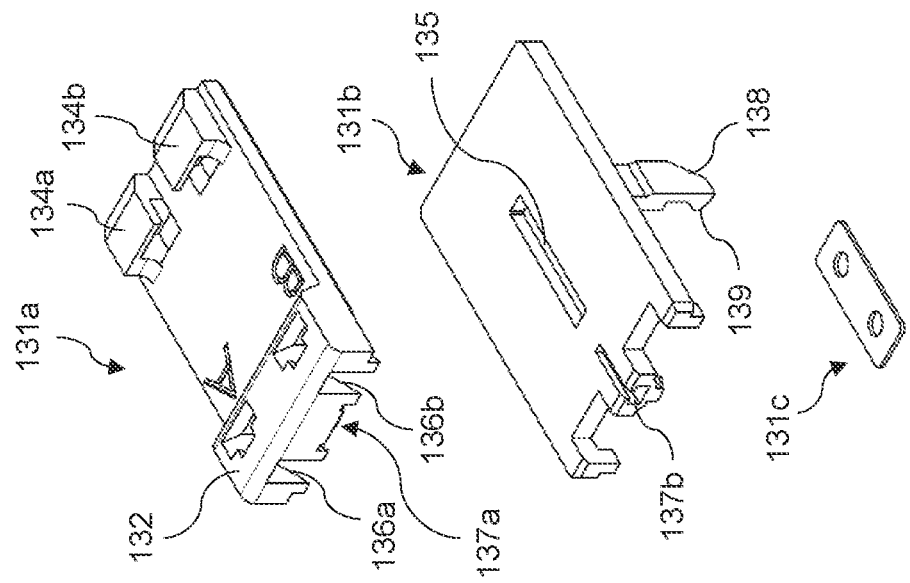
FIG. 7 is an assembly view of a latch actuator of a reversible optical connector according to one or more embodiments of the present disclosure.

FIG. 7 shows an exploded view of the latch actuator 130. The latch actuator 130 comprises a top plate 131a, a bottom plate 131b, and a connecting plate 131c. The top plate 131a includes the camming portion 132, with first and second cam surfaces 136a, 136b positioned in respective openings of the cam portion 132. Proximal ends of the latches 124a, 124b, which include cam engagement portions 160 (FIG. 5) can be positioned within the openings of the cam portion 132 and positioned to contact or engage the cam surfaces 136a, 136b. The cam surfaces 136a, 136b are configured to apply a downward force on the cam engagement portions 160 when the top plate 131a is moved proximally. This displaces the cam engagement portions 160 and the latches 124a, 124b. The top plate 131a further includes a keyed projection 137a on an underside of the top plate 131a configured to be slidably positioned within a corresponding key slot 137b of the bottom plate 131b. The top plate 131a also includes tab grips 134a, 134b configured to grip or catch a pull tab. In that regard, a hook of a pull tab can be positioned within the tab grips 134a, 134b such that pulling the tab also pulls the top plate 131a of the latch actuator 130.

The bottom plate 131b includes a slot 135 through which connecting dowels of the top plate 131a can be positioned and connected to the connecting plate 131c via the holes of the connecting plate 131c. When the connecting tabs of the top plate 131a are positioned through the slot 135 and connected to the holes of the connecting plate 131c, a sliding connection is formed between the top and bottom plates 131a, 131b, with the bottom plate 131b sandwiched between the top plate 131a and the connecting plate 131c. The top and bottom plates 131a, 131b are coupled to slide within a regulated range. The regulated range can be defined by the width of the slot 135 relative to the spacing between the connecting tabs of the top plate 131a. The bottom plate 131b also includes connecting arm 138, which extends downward from the bottom plate 131b orthogonal to the plane or top surface of the bottom plate 131b. In the example shown, the connecting arm 138 includes a barb or pawl 139. The barb or pawl 139 comprises a protrusion extending inward from the arm 138 that is configured to engage the ridge 118 of the housing 110. The barb 139 can include an angled surface, such that the angled surface is oblique relative to a bottom surface of the ridge 118 when the barb 139 engages the ridge 118. The angled surface of the barb 139 can enable a releasable or detachable connection between the latch actuator 130 and the housing 110. In that regard, in some embodiments, the latch actuator 130 is configured to be removed from and reattached to the housing 110, by hand, by lifting the latch actuator 130 from the housing 110. In this example, the connecting arm may elastically deflect to permit removal or reattachment to the housing 110. Other implementations utilize a snap fit or other connector in place of the barb or pawl 139 to removably attach the latch actuator 130 to the housing 110.

Figure 8:
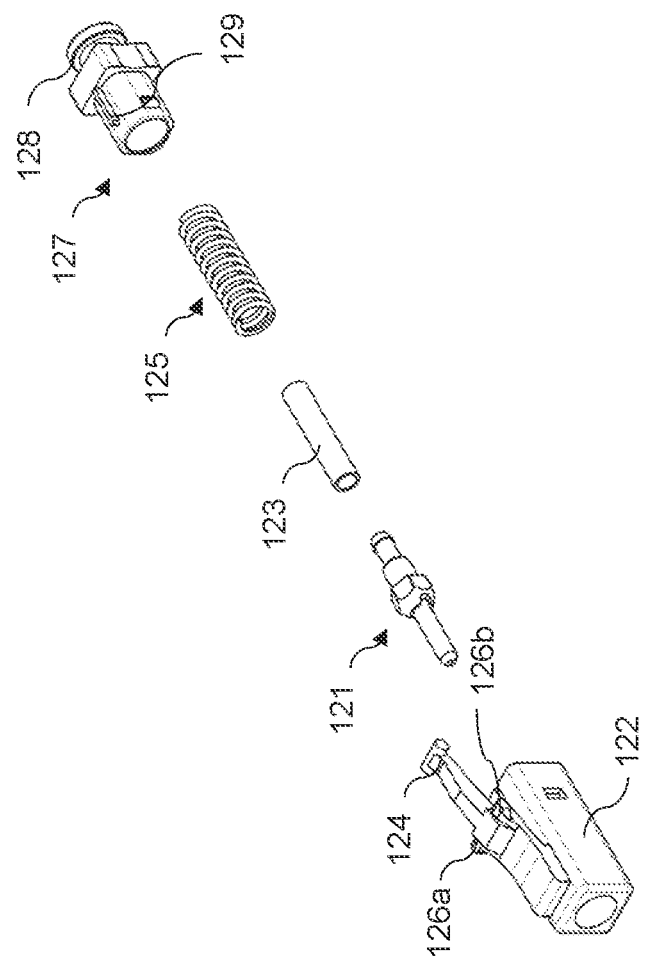
FIG. 8 is an exploded view of an optical plug of a reversible optical connector according to one or more embodiments of the present disclosure.

An exploded view of a plug 120 is shown in FIG. 8. In this example, the plug 120 includes a plug body 122, which a latch 124 coupled to a side of the plug body 122. The latch 124 includes locking shoulders or surfaces 126a, 126b at an intermediate portion of the latch 124. The locking shoulders 126*a*, 126*b* are configured to engage corresponding surfaces or projections in an adapter to form a latch connection. The latch connection is unlatched, canceled or released by depressing the proximal portion of the latch 124 toward the plug body 122, which disengages the shoulders 126*a*, 126*b* from the corresponding locking surfaces of the adapter. The latch 124 is biased such that the latch 124 extends away from the plug body 122 at the proximal portion of the latch 124.

A ferrule 121 and ferrule tube 123 are configured to be positioned within the plug body 122, with a spring 125 positioned around the ferrule 121 and ferrule tube 123 within the plug body 122. An extender cap, 127 which includes the flange 128 at the proximal end, is positioned partially within the plug body 122 to form a locking connection with the plug body 122 and hold the ferrule 121 and ferrule tube 123 within the plug body 122. The extender cap 127 also includes a stop ridge 129 extending from a lateral surface of the extender cap 127, which will be described further below. The components of the plug 120 form a conduit or lumen in which an optical fiber can be housed or positioned to facilitate signal communication between the plug 120 and an adapter.

Figure 9:
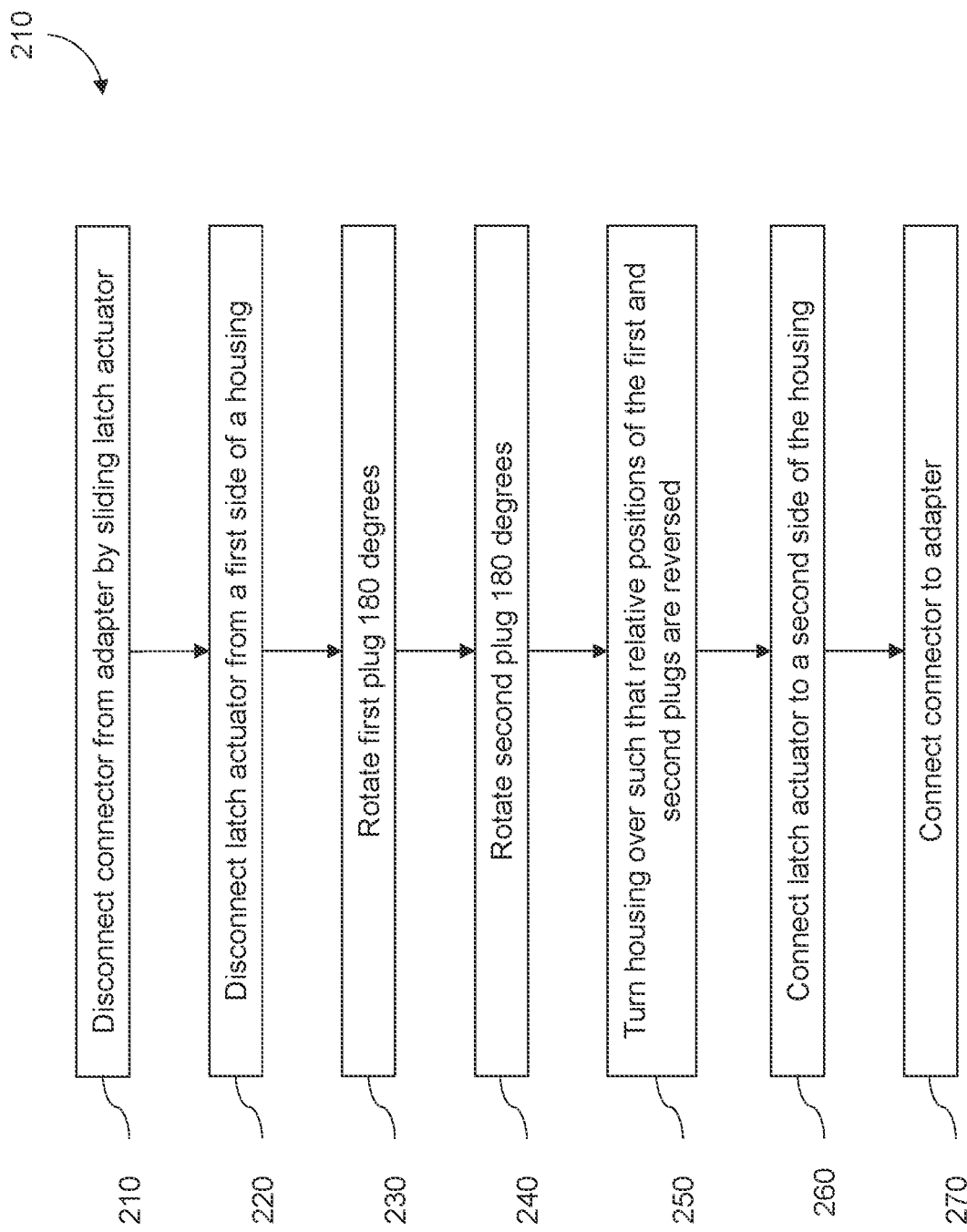
FIG. 9 is a flow diagram showing a method for reversing an optical connector plug configuration according to one or more embodiments of the present disclosure.

As mentioned above, in some instances it is desirable to switch or reverse the plug configuration of a connector. Conventional connectors may require disassembly of the connector to change the plug configuration, which may be inconvenient and impractical. The embodiments described in the present disclosure provide connectors with reversible plug configurations. Accordingly, a technician can reverse the plug configuration without significant disassembly of the connector. In that regard, FIG. 9 is a flow diagram that illustrates a method 200 of reversing or switching a plug configuration of a reversible optical connector, according to aspects of the present disclosure. FIGS. 10A-10E illustrate an embodiment of a connector at various steps of the method 200. For example, the method 200 can be performed with the connector 100 described above and shown in FIGS. 1-8.

In step 210, the connector is disconnected from an adapter by sliding a latch actuator proximally relative to the plug latches. The latch actuator comprises a camming surface that depresses the latches as the latch actuator moves proximally.

In step 220, the latch actuator 130 is disconnected and removed from the housing 110 of the connector 100 by applying a lifting force to the latch actuator 130 away from the housing 110. The lifting force may cause the connecting features, shown here as a barb or pawl, to disengage from the housing, in some embodiments. That is, the barb or pawl may disengage from a ridge or other retaining feature. In some instances, the barb or pawl is on the housing.

Figure 10A:
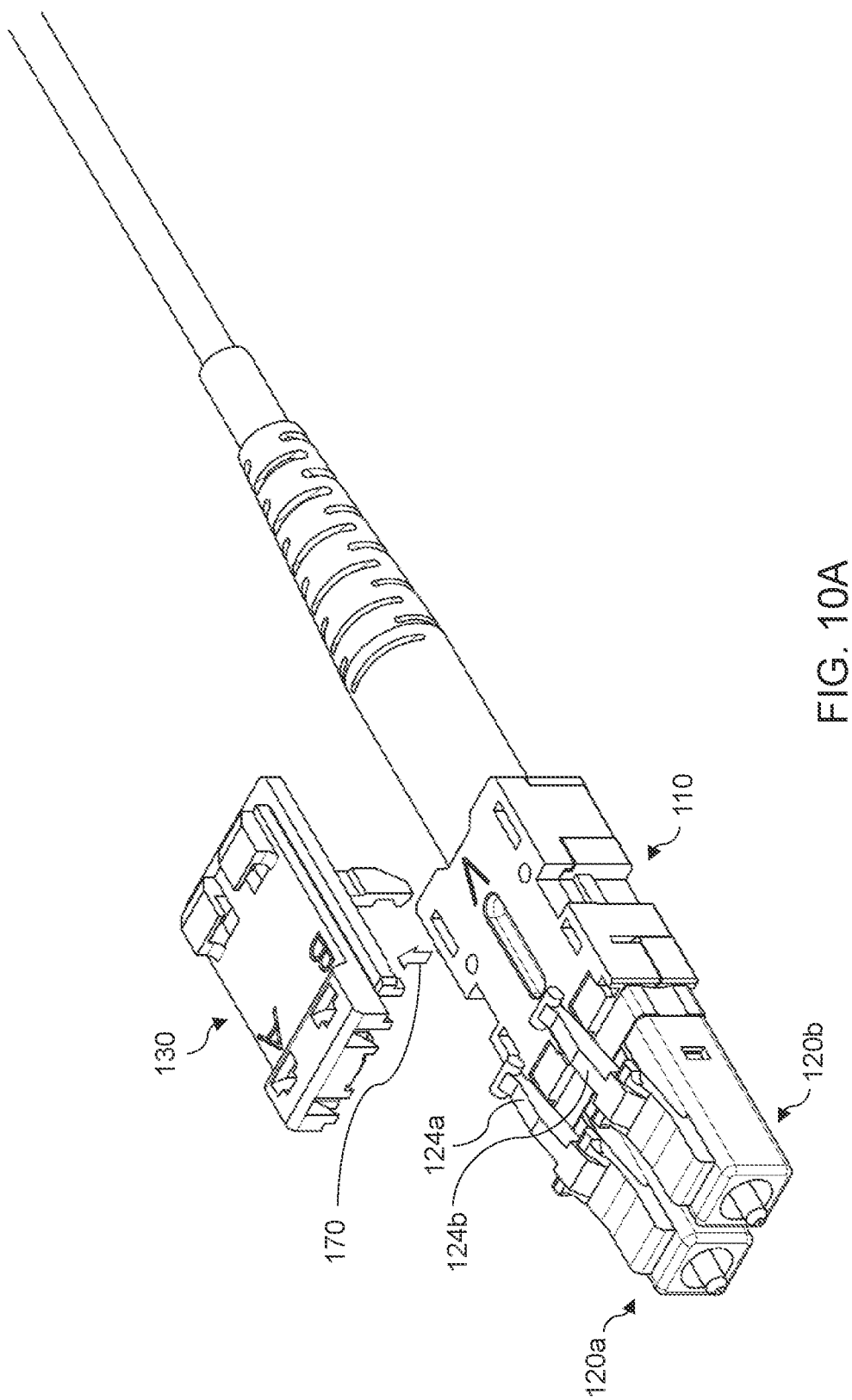
Figure 10B:
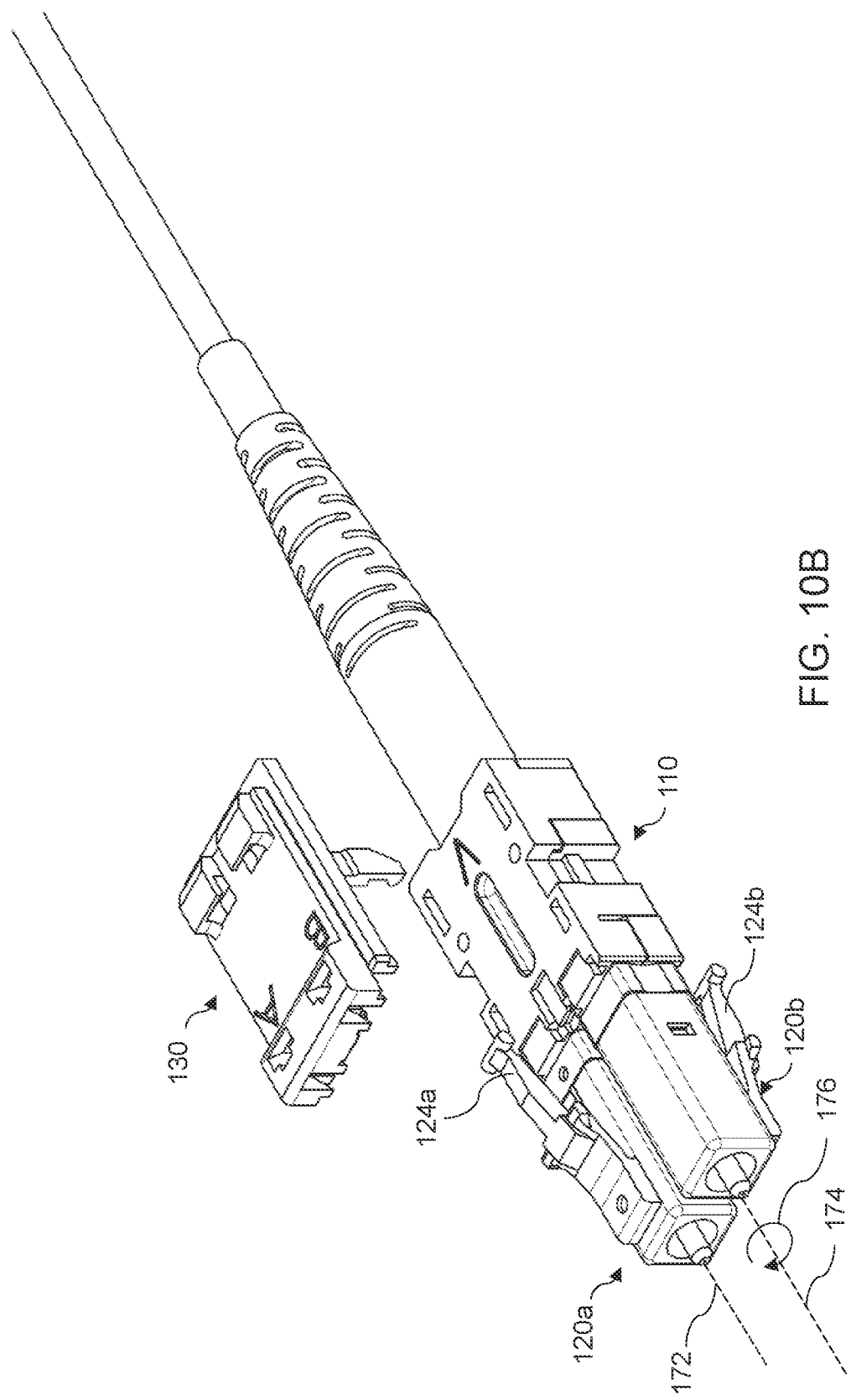
Figure 10C:
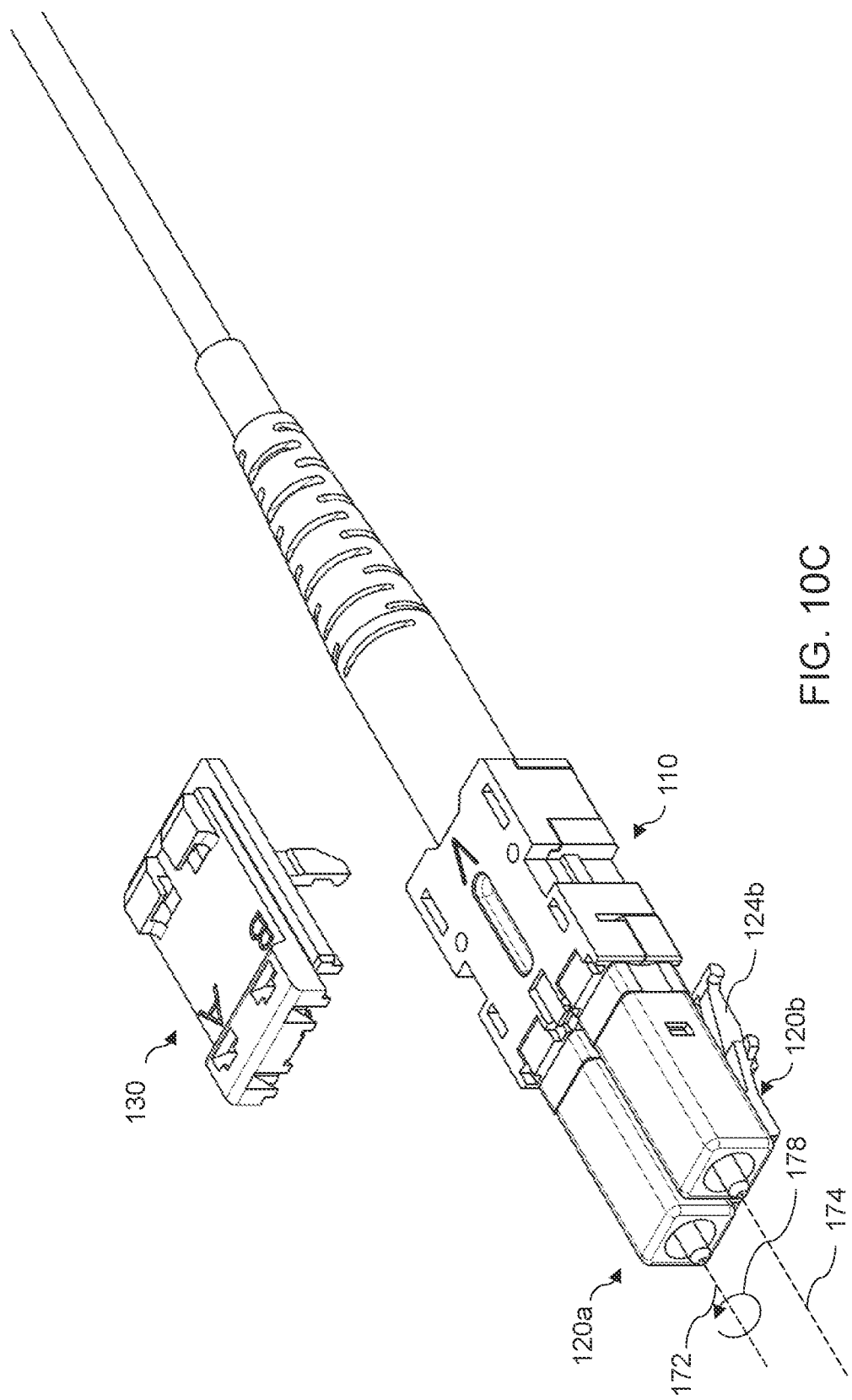
Figure 10E:
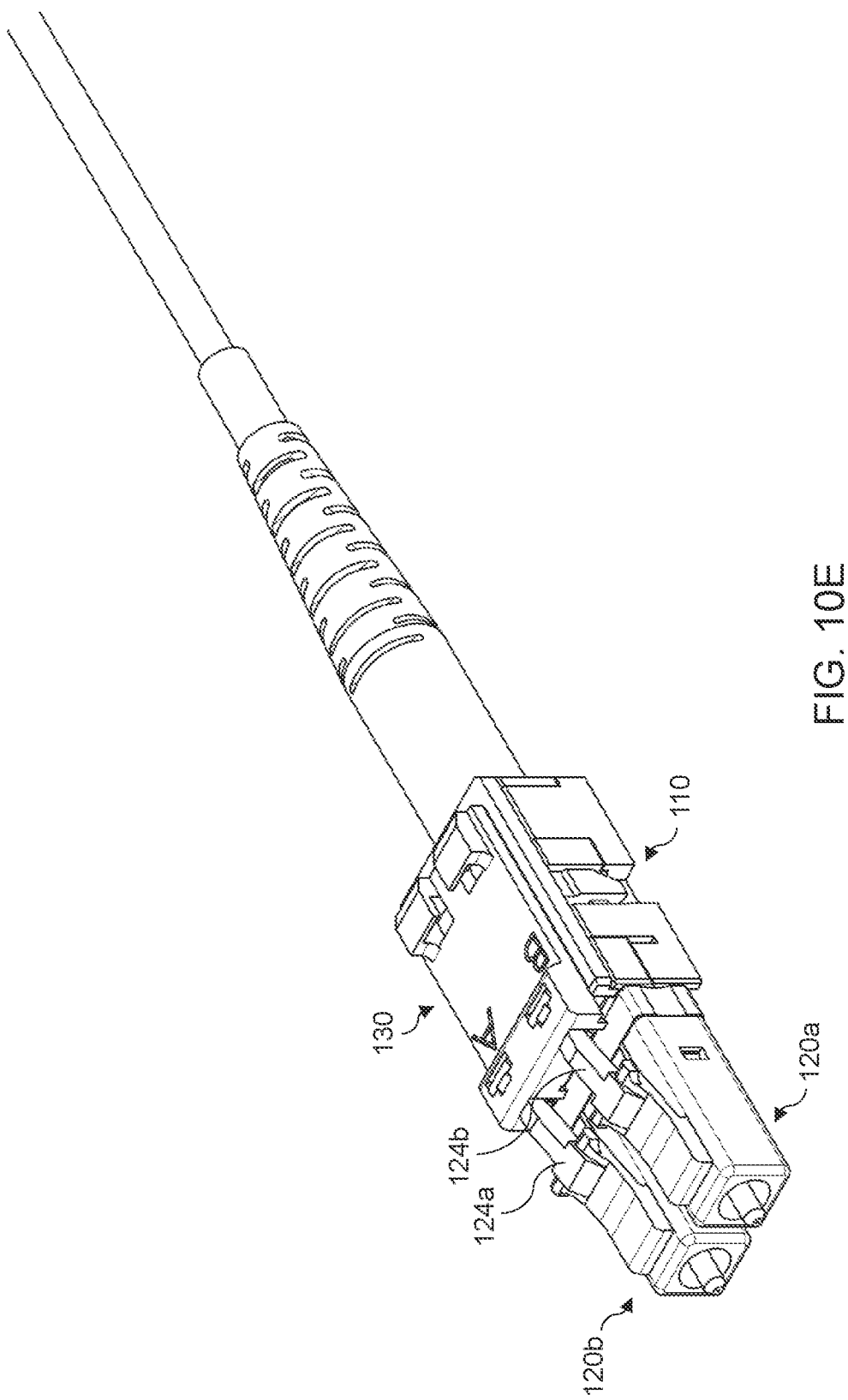

FIG. 10A shows the connector 100 with the latch actuator 130 disconnected from housing and removed. In the implementation shown, the latch actuator 130 is removed by lifting the latch actuator 130 from the housing 110 as indicated by the arrow 170. However, other configurations of a detachable latch actuator 130 are contemplated, such as latch actuators detached from the housing 110 by twisting, sliding, depressing, and/or any other suitable arrangement. Referring to FIG. 10B, each of the plugs 120*a*, 120*b* may be rotatable about an axis 172, and an axis 174, respectively. In step 230, one of the plugs 120*b* is rotated 180 degrees about the axis 174 relative to the housing, indicated by arrow 176, such that the latch 124*b* is positioned on an opposite side of the connector 100 relative to the other latch 124*a*. Referring to FIG. 10C, in step 240, the other plug 124*a* is rotated 180 degrees about the axis 172 relative to the housing 110, as indicated by the arrow 178, such that the latches 124*a*, 124*b* are now positioned on a same side of the connector 100. The symbol "V" is shown on the top-facing surface of the housing 110. Referring to FIG. 10D, in step 250, the connector 100 is turned over, as indicated by the arrow 180, such that the opposing side of the housing is facing up. In that regard, the symbol "X" on the opposing surface of the housing relative to the "V" symbol is now facing up in FIG. 10D. Additionally, the relative position of the plugs 120*a*, 120*b* is switched when compared to the positions shown in FIG. 10C. Referring to FIGS. 10D and 10E, the latch actuator 130 is replaced or reattached to the housing 110 in step 260, as indicated by the arrow 182. As above, the latch actuator 130 connects to the housing 110 by engaging the barb 139 of the connecting arm 138 with a ridge on a lateral side of the housing 110. It will be understood that the housing 110 may comprise similar or identical ridges on both lateral sides of the housing 110 so that the connecting arms 138 of the latch actuator 130 can attach to either side of the housing 110. Further, the ridges 118 which the connecting arms 138 engage can be symmetrical about a longitudinal plane. In other words, the ridges 118 may comprise similar or identical shelves on the tops and bottoms of the ridges 118 to allow for engagement of the latch actuator connecting arms 138 in either connector configuration.

FIG. 11 shows a partially transparent side view of the connector 100, with the latch 124 in an engaged position. As shown, the latch actuator 130 comprises a camming surface 136 in contact with a distal portion of the latch 124. The latch 124 is at the highest portion of the camming surface 136. As the latch actuator 130 is shifted proximally, the angled camming surface 136 causes the latch 124 to deflect downward to disengage the latch 124. Accordingly, with the latch 124 positioned within the latch actuator 130, the latch actuator is biased to a relaxed position in which the top plate 131*a* is positioned as far distally relative to the bottom plate 131*b* as the regulated connection allows.

FIGS. 12A and 12B are cross-sectional views of the connector 100 shown in FIG. 11 at the line A-A. In FIG. 12A, the plugs 120*a*, 120*b* are configured such that their respective latches 124*a*, 124*b* are on a top side of the connector 100. By contrast, in FIG. 12B, the plugs 120*a*, 120*b* are rotated 180 degrees relative to the orientations in FIG. 12A such that their respective latches 124*a*, 124*b* are on a bottom side of the connector 100. The opening portions 113*a*, 113*b* of the housing include rotator catches 119*a*, 119*b*, 119*c*, 119*d* configured to limit the amount of rotation of the plugs 120*a*, 120*b* relative to the housing 180. The plugs 120*a*, 120*b* are limited to rotate within a 180 degree arc. Each plug 120*a*, 120*b* comprises a stop ridge 129*a*, 129*b* that limits rotation of the respective plug 120*a*, 120*b* by catching or contacting the rotator catches 119*a*, 119*b*, 119*c*, 119*d*. With the plugs 120*a*, 120*b* rotated 180 degrees, the latch actuator 130 can be replaced on the opposing (i.e. bottom) side of the connector 100.

It will be understood that the specific embodiments described above are exemplary, and that various changes or modifications can be made without departing from the scope of this disclosure. For example, in some embodiments, a connector can include more than two plugs, including three, four, five, or any suitable number of plugs. In some embodiments, the connectors are used to facilitate electrical connections. In some embodiments, a latch actuator may comprise a single plate slidably coupled to the housing. In still other embodiments, the latch actuator can cancel the latch connection in a manner different than the embodiments described above, including by lifting the latches. In some embodiments, the plugs are configured to rotate 360 degrees relative to the housing.

Persons skilled in the art will recognize that the devices, systems, and methods described above can be modified in still other ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A connector for a communication cable, comprising:
   a housing;
   a first plug and a second plug coupled to a distal portion of the housing, the first plug and the second plug being rotatable relative to the housing, the first plug comprising a first latch and the second plug comprising a second latch; and
   a sliding actuator removably coupled to a first side of the housing, the sliding actuator comprising at least one surface configured to actuate the first latch and the second latch, wherein the housing and sliding actuator are configured such that the sliding actuator can be removed from the first side of the housing by lifting the sliding actuator from the first side of the housing, and wherein the sliding actuator is removably couplable to a second side of the housing opposite the first side of the housing.

2. The connector of claim 1, wherein each of the first and second plugs comprises a flange positioned within a respective slot at the distal portion of the housing.

3. The connector of claim 2, wherein the first and second plugs comprise conduits disposed within a cavity of the housing, the conduits configured to carry respective communication lines.

4. The connector of claim 3, wherein the respective communication lines comprise optical fibers, and wherein the conduits of the first and second plugs are configured to house a first optical fiber and a second optical fiber, respectively.

5. The connector of claim 1, wherein the housing comprises at least one ridge and the sliding actuator comprises at least one pawl connector configured to releasably engage the at least one ridge of the housing.

6. The connector of claim 5, wherein the sliding actuator comprises at least one flexible arm extending orthogonal to a plane of translation of a bottom plate of the sliding actuator, and wherein the at least one pawl is disposed at a distal portion of the at least one flexible arm.

7. The connector of claim 1, wherein the sliding actuator comprises a top plate and a bottom plate coupled to the top plate, the top plate configured to slide longitudinally relative to the bottom plate.

8. The connector of claim 7, wherein the bottom plate is configured to remain stationary relative to the housing when the top plate slides longitudinally to actuate the first latch and the second latch.

9. The connector of claim 7, further comprising a pull tab coupled to and extending proximally of the top plate of the sliding actuator.

10. The connector of claim 7, wherein the first latch and the second latch are respectively biased away from the first plug and the second plug, and wherein the sliding actuator is configured to depress, via the at least one surface, the first latch and the second latch by sliding the top plate longitudinally relative to the bottom plate.

11. The connector of claim 10, wherein each of the first latch and the second latch comprises a locking surface positioned at intermediate portions of the first latch and the second latch, wherein each locking surface is configured to engage corresponding surfaces in an adapter.

12. The connector of claim 7, wherein:
   the at least one surface comprises a first angled surface and a second angled surface;
   the top plate comprises a camming portion defining a first opening and a second opening;
   the first angled surface is disposed adjacent the first opening and the second angled surface is disposed adjacent the second opening; and
   the first latch comprises a first engagement portion configured to be positioned within the first opening, and the second latch comprises a second engagement portion configured to be positioned within the second opening.

13. The connector of claim 1, wherein the first plug and the second plug extend distally and in parallel from the distal portion of the housing.

14. The connector of claim 1, wherein the first plug defines a first longitudinal axis and the second plug defines a second longitudinal axis, the first plug and the second plug being rotatable about the first longitudinal axis and the second longitudinal axis respectively.

15. An apparatus, comprising:
   a body defining an enclosure, the body configured to attach to a distal end of an optical cable;
   a first optical plug rotatably coupled to a first distal portion of the body, the first optical plug comprising a first engagement feature configured to releasably engage an optical outlet;
   a second optical plug rotatably coupled to a second distal portion of the body, the second optical plug comprising a second engagement feature configured to releasably engage the optical outlet; and
   an actuator releasably coupled to a first side of the body, the actuator configured to slide relative to the body to disengage the first engagement feature and the second engagement feature from the optical outlet, wherein the actuator is configured to decouple from the body and the optical cable and recouple to a second side of the body opposite the first side.

16. The apparatus of claim 15, wherein the body comprises at least one ridge and the actuator comprises at least one pawl connector configured to releasably engage the at least one ridge of the body.

17. The apparatus of claim 16, wherein the actuator comprises at least one flexible arm extending orthogonal to a plane of translation of a bottom plate of the actuator, and wherein the at least one pawl is disposed at a distal portion of the at least one flexible arm.

18. The apparatus of claim 15, wherein the actuator comprises a top plate and a bottom plate coupled to the top plate, the top plate configured to slide longitudinally relative to the bottom plate.

19. The apparatus of claim 18, wherein the bottom plate is configured to remain stationary relative to the body when the top plate slides longitudinally to disengage the first engagement feature and the second engagement feature from the optical outlet.

20. The apparatus of claim 18, wherein the first engagement feature and the second engagement feature are respectively biased away from the body, and wherein the actuator comprises at least one camming surface configured to depress the first engagement feature and the second engagement feature by sliding the top plate longitudinally relative to the bottom plate.

* * * * *